(12) United States Patent
Getzlaf et al.

(10) Patent No.: US 8,163,679 B2
(45) Date of Patent: Apr. 24, 2012

(54) METHOD FOR APPLYING REMEDIAL CEMENT TO A WELLBORE

(75) Inventors: Donald Getzlaf, Calgary (CA); Marty Stromquist, Calgary (CA)

(73) Assignee: Cemblend Systems, Inc., Calgary (CA)

( * ) Notice: Subject to any disclaimer, the term of this patent is extended or adjusted under 35 U.S.C. 154(b) by 170 days.

(21) Appl. No.: 12/472,178

(22) Filed: May 26, 2009

(65) Prior Publication Data

US 2009/0298724 A1    Dec. 3, 2009

Related U.S. Application Data

(60) Provisional application No. 61/056,351, filed on May 27, 2008.

(30) Foreign Application Priority Data

May 26, 2008  (CA) ..................................... 2632319

(51) Int. Cl.
*C09K 8/528* (2006.01)
*C09K 8/74* (2006.01)
*E21B 43/00* (2006.01)
*E21B 33/00* (2006.01)

(52) U.S. Cl. ........ 507/274; 507/269; 166/265; 166/267; 166/285

(58) Field of Classification Search ................. 507/274, 507/269; 166/285, 265, 267
See application file for complete search history.

(56) References Cited

U.S. PATENT DOCUMENTS

| | | | |
|---|---|---|---|
| 5,645,518 | A | 7/1997 | Wagh et al. |
| 5,830,815 | A | 11/1998 | Wagh et al. |
| 5,846,894 | A | 12/1998 | Singh et al. |
| 6,518,212 | B1 | 2/2003 | Wagh et al. |
| 6,910,537 | B2 | 6/2005 | Brown et al. |
| 7,438,755 | B2 | 10/2008 | Wagh et al. |

*Primary Examiner* — Timothy J. Kugel
*Assistant Examiner* — Atnaf Admasu
(74) *Attorney, Agent, or Firm* — Slater & Matsil. L.L.P.

(57) ABSTRACT

A cement composition and method of applying remedial cement to a downhole perforation is described. The method involves the sequential delivery of a phosphate acid activator and a silicate suspension to the perforation to allow in situ reaction of the activator with the binder within the perforation, thereby forming a phosphosilicate plug.

16 Claims, No Drawings

METHOD FOR APPLYING REMEDIAL CEMENT TO A WELLBORE

This application claims the benefit of Canadian Application No. 2,632,319, entitled "Method for Applying Remedial Cement to a Wellbore," filed on May 26, 2008 and U.S. Provisional Application No. 61/056,351 entitled "Method for Applying Remedial Cement to a Wellbore", filed on May 27, 2008, which are incorporated herein by reference.

FIELD OF THE INVENTION

The present invention relates generally to the application of remedial cement to a wellbore. More particularly, the present invention relates to a cementing method that allows secondary cement to be precisely placed to seal perforations without sealing the casing shaft.

BACKGROUND OF THE INVENTION

Following perforation of a wellbore casing, a visual inspection is used to determine whether each perforation is open or blocked, and whether oil, gas or water is being produced therefrom. The results of this inspection are logged and any non-productive perforations or sources of undesirable leakage along the wellbore may be subsequently sealed. This is typically done by isolating the zone containing the perforation to be sealed, and pumping a Portland cement slurry to the zone under pressure to force the slurry into the perforation. This is known as squeeze cementing. Equipment is then removed from the isolated zone and the cement is allowed to set across the diameter of the casing. In order to regain access to the wellbore below the now-sealed perforation, the cement seal across the casing is drilled out, leaving only the plugged perforation.

One challenge in remedial cementing jobs is to provide a cement slurry that will not harden prior to placement downhole but, once appropriately placed, will quickly harden to a suitable strength. Accordingly, a retardant or accelerant is often added to the cement slurry to enable positioning of the slurry in the wellbore while avoiding premature setting of the cement. Typically, application of remedial cement to a wellbore requires one day of work, curing requires an additional day of lost productivity, and drilling out and pressure testing results in another lost day.

Unfortunately, it is common for such remedial cementing operations to fail pressure tests, requiring another remedial cementing run, following by setting, redrilling, and retesting. This seal, test, repeat process often results in many days of lost productivity in addition to the direct costs of the additional cementing procedures. New technologies to prevent or limit this source of revenue loss would be desirable.

Various cement compositions have been described for use in a variety of applications. Typical hydraulic cement slurries have a setting time that is dependent on ambient temperature, making setting during cold conditions unreliable. Moreover, hydraulic cements have low acid resistance and high porosity, which impacts their reliable use downhole in certain circumstances.

Ceramic cement formulations have been described in the art, including the chemically bonded phosphate ceramic binders and Ceramicrete® formulations of Argonne Laboratories. This cement is currently being used in various applications, such as dentistry, encapsulation of nuclear waste, runway repair, and construction projects.

For example, U.S. Pat. No. 6,518,212 to Wagh, et al., describes the formation of a chemically bonded phosphosilicate ceramic by mixing a powdered binder (composed of an alkali metal phosphate and an oxide) with water to form a ceramic cement slurry for use in various applications.

U.S. Pat. No. 6,910,537 to Brown, et al., describes a chemically bonded phosphate ceramic cement sealant for plugging boreholes. In this patent, ceramic cement slurry is formed at surface and lowered downhole within a canister for application to the appropriate wellbore location.

Further, US Published Patent Application No. 2006/0048682 to Wagh, et al., describes the use of phosphate ceramic cement formulations in oil or geothermal wells. Formulations for use in shallow and deep wells are described, and alterations to increase and decrease thickening time are discussed. Although a properly formulated composition is said to bond well to steel and to downhole formations (rocks, etc.), the need for customized adjustments to the formulation, for example to avoid premature setting of the cement based on well depth, suggests that use of these compositions to plug wellbores may be burdensome to the operator.

SUMMARY OF INVENTION

In accordance with one aspect, there is provided a phosphosilicate ceramic, formed by contacting a phosphate acid activator with an aqueous silicate binder suspension.

In an embodiment, the phosphate acid activator is liquid phosphoric acid, or a dissolved phosphate acid. The silicate binder may comprise microfine calcium silicate, and the binder may further comprise one or more additives, such as fly ash, slag, silicafume, or a bridging agent. In suitable embodiments, the binder is of a particle size between 200 and 5000 mesh.

In a further embodiment, the binder suspension further comprises a slow-release activator compound, for example, a mixture of a phosphate acid and a clay.

In an embodiment, the phosphosilicate ceramic is formed in situ at a precise location, by sequential delivery of the activator and binder to the precise location.

In accordance with another aspect, there is provided a slow setting phosphosilicate ceramic composition for application to a downhole location, the composition comprising a silicate binder, a clay, and a phosphate acid activator.

In accordance with yet another aspect, there is provided a slow-release activator composition for reaction with a silicate to form a phosphosilicate ceramic, the slow-release activator composition comprising a mixture of clay and a phosphate acid.

In another aspect, there is provided a method for sealing a permeable zone along a wellbore, the method comprising the steps of: delivering a phosphate acid activator to the permeable zone; delivering an aqueous silicate binder suspension to the permeable zone; and allowing the activator and binder to react within the permeable zone to form a phosphosilicate ceramic composition.

In various embodiments, the phosphate acid activator is liquid phosphoric acid, a dissolved phosphate acid, or another suitable liquid activator.

In an embodiment, the silicate binder is calcium silicate. In suitable embodiments, the particle size of the binder is between 200 and 5000 mesh.

In an embodiment, the binder suspension further comprises a slow-release activator compound, for example, a mixture of a phosphate acid and a clay.

In an embodiment, the permeable zone is a zone of undesirable permeability or porosity, such as a casing perforation. A wellbore segment containing the perforation may be isolated by means known in the art, to precisely deliver measured amounts of activator and binder to the permeable zone. In such embodiment, the binder and activator may each be displaced into the permeable zone by application of hydraulic pressure within the isolated wellbore segment.

In further embodiments, the above may be applied to permeable zones within cased and perforated, or uncased wellbores.

In another aspect, there is provided a method for sealing a permeable zone along a wellbore comprising the steps of: combining a phosphate acid activator with a clay to produce a slow-release activator; combining the slow-release activator with a silicate binder; delivering the resulting mixture to a downhole permeable zone; and allowing the mixture to form a phosphosilicate ceramic plug at the permeable zone.

Other aspects and features of the present invention will become apparent to those ordinarily skilled in the art upon review of the following description of specific embodiments of the invention.

DETAILED DESCRIPTION

Generally, a microfine ceramic cement composition and method for applying same downhole are described herein. The cement is provided as two separate components that, when mixed, form a cement slurry that quickly sets and cures. The components are kept apart and delivered sequentially to the location at which cementing is desired. Upon contact at the desired location, the components react to form a quick-setting microfine cement composition.

The composition and method are intended for use downhole. Specifically, the most relevant application to date relates to use downhole outside of the casing to seal unwanted permeable zones, for example: preventing gas migration through a formation and/or perforation; reducing groundwater and other water sources from coal, sand, and other permeable zones; evaluation of deep zones; and casing repairs. The method and cement composition are particularly useful in plugging perforations, as the components may be sequentially introduced very precisely at the desired location to form a robust cement plug along the outside of the casing, adhering to both the surrounding formation and to the exterior surface of the casing. As cement need not be set within the casing or wellbore using the present method, drillout of the excess cement after plugging is not necessary.

It should be noted that use of the term "perforation" herein may also apply to zones of permeability or porosity along the wellbore, or to any location along the wellbore that cementing is desired. Further, while the present description focuses on application of the method to wells having perforated casing, the composition and method are also applicable in open hole wells in which plugging of a permeable zone is desired, and in other related downhole applications.

Overview

The cement slurry is formed by mixing a liquid ceramic activator with a microfine binder. Neither the activator nor the binder will form cement alone, but once the two come in contact, a phosphosilicate cement slurry is formed that begins to set immediately. Thus, in plugging a specific perforation, the activator may first be introduced by zonal isolation techniques to allow the activator to enter the perforation, also seeping into the surrounding formation. The zone is flushed, and the binder is then introduced. The binder contacts all surfaces within the zone and also penetrates the perforation to contact the activator outside the casing. As the activator is only present at this location, formation of the cement slurry will be localized and cement will set to block the perforation. Excess binder is removed from the wellbore and the cement is allowed to cure. No drillout is required, as no cement is present within the casing.

The entire process, including setting of the cement, takes no more than approximately four hours and no drilling out is required. After same-day pressure testing, the well is returned to the operator.

Generally, the cements useful with the method described herein are modified phosphosilicate ceramic cements. Phosphosilicate ceramic cements in general, as described by Wagh, et al. (U.S. Pat. No. 6,518,212, which is hereby incorporated in its entirety herein), are typically formed by combining an alkali metal phosphate powder with an oxide powder, and then adding a silicate powder. The powdered combination is activated by addition of water to form a cement slurry.

In the present composition, the components of the chemical reaction required to generate the slurry may be provided as two liquid components:

1) A liquid activator, typically a phosphoric acid; and
2) A binder suspension, typically a suspension of a microfine silicate in water.

By separating the phosphate source from the silicate, both components may be held in a liquid phase for independent, sequential penetration into and through the desired perforation. When the components come into contact upon displacement of the binder into the perforation, an immediate reaction occurs to produce phosphosilicate microceramic cement in situ.

The reaction is generally described as calcium silicate ($Ca_2SiO_4$) reacting with a phosphoric acid ($H_3PO_4$) to form a calcium phosphate silicate cement. If desired, the silicate may be combined with an additive such as fly ash, silicafume, zeolite, metakaolin, or slags. With respect to the activator, various phosphate acids (monopotassium phosphate, monocalcium phosphate, and other acid phosphates) can be dissolved in an aqueous solution. Divalent metal oxides (for example magnesium oxide, or zinc oxide) may also be added to further strengthen the cement.

Activator

Suitable activators for use in the present composition include phosphoric acids of about 10-75% saturation, and typically about 45-65% is suitable. The liquid nature of the activator allows complete saturation of the isolated zone, seeping through the perforation and into the formation. Pressurized delivery and precise volume measurements improve absorption of the activator outside of the casing.

Binder

Suitable binders for use in the present composition include microfine silicate powders in suspension; for example, microfine calcium silicate suspended in water at a ratio of 0.2 to 2 parts water/one part cement. The microfine nature of the binder permits extensive penetration of the suspension through the perforation, sealing the perforation from outside the casing.

Suitable powders of microfine calcium silicate binder range from a mesh size from about 200 mesh to about 5000 mesh (i.e., from about 6-12 microns diameter) and remains in suspension to form a viscous liquid. Suspending aids may be added if desired. Despite the apparent viscosity of the resulting suspension, the particles are able to penetrate perforations when delivered through coiled tubing and displaced into the perforation using water, air, and/or nitrogen.

Once the binder contacts the activator, an impermeable quick-setting cement is formed, sealing any channels or porosity near the perforation site. Typically, less than one cubic metre of cement is formed per perforation interval.

Method

Once a perforation or otherwise permeable zone is selected for cement plugging, an appropriate wellbore interval is isolated, localizing the treatment area to which the cement components will be applied. Typically, a straddle tool, or combination of tools, for isolating the desired zone is deployed on coiled tubing or tubing, with a lubricator system to control surface pressure. Precise zonal isolation may be obtained, and a mechanical casing collar locator may be used to position the equipment to appropriate depth. Once set, a standard feed rate may be determined using nitrogen, water, or compressed air to standardize volume delivery and pressure measurements within the isolated zone.

Using the aforementioned known volumes and feed rates, an amount of activator is delivered under pressure to the isolated zone. The pressurized delivery will force the activator through the perforation and into the surrounding formation such that all activator solution has been displaced from the casing to saturate the area outside the perforation. The binder is then delivered to the isolated zone under pressure, again being forced into and through the perforation to be plugged, where contact is made with the previously delivered activator. The cement is allowed to set and cure in the perforation. Pressure tests may be conducted to determine the strength of the cement plug, and then the temporary zonal isolation tools may be removed from the wellbore.

The sequential delivery of activator and binder may be carefully controlled to ensure that the two components do not meet within the casing. This may be achieved, in one embodiment, by using a bullhead push method of delivery, in which the components are stacked within the tubulars, separated by a volume of water. For example, 300 litres of activator followed by 25 litres of water, then 400 litres of binder solution, and finally water to displace the binder. The initial delivery of activator is pressurized by hydraulic pressure against the stacked components above. The final volume of water is used to push the binder through the perforations to contact the previously delivered activator. Tool removal is not required during curing, and after a suitable wait time the remaining water within the tubing may be used to complete the pressure test.

Alternatively, a balanced method may be used to introduce each component to the perforation sequentially. This method is more useful when the perforation or formation has reduced porosity or increased pressure, or otherwise will not easily take up additional fluids. In this case, the activator is delivered and positioned across the perforation, and excess is then washed from the wellbore. The binder is then positioned across the perforation and pushed into the perforation using a squeeze technique, where it will react with the activator.

It is noted that the delivery sequence of the activator and binder discussed above is for the purpose of illustrative example only. That is, the binder may instead be initially delivered to the zone, followed by the activator. This may be particularly suitable in open hole settings, and/or when the formation readily takes up liquid. A binder of larger particle size may be used in these situations; for example, to limit excessive penetration into the formation. Further, bridging agents may be used in such situations to add bulk to the composition.

The microfine particle size of the binder component allows penetration into the surrounding formation, even when the formation is primarily sand, silt, shale, coal, or carbonate. The microfine ceramic cement also binds to metal surfaces, forming a robust plug between the formation and the casing. As such, the present composition and method is useful even in the presence of excess water; for example, in shutting off water flow in a carbonate, coal, or sand formation, or reducing permeability and subsequent gas migration.

The present composition is particularly useful in shallow well water control, lost circulation, and gas migration cementing. Shallow wells may have bottom hole temperatures as low as 5 degrees C., and conventional Portland cement has been shown to be unreliable at these temperatures.

The application and setting of the present cement compositions are independent of wellbore conditions. Other advantages of the present composition and method include pinpoint isolation and plugging of problematic perforations without disturbing productive perforations; avoiding drillout of the wellbore following cementing; the wellbore annulus remains dry during the procedure; internal diameter of the casing is unaltered following the procedure; and minimal production interruption is experienced as the isolation, treatment, cement setting; pressure testing, and equipment removal can all be completed in one day.

The set time of the cement composition may be adjusted by varying the concentration of the activator, concentration of solids in the binder, or addition of borax or boric acid. The set time is generally adjustable from 1-60 minutes.

If desired, an encapsulation technique can be utilized to aid in the formation of cement at the perforation. This technique involves the mixture of a further amount of activator with a clay, which absorbs and encapsulates the activator to create a slow-release activator, which is then added to the binder mixture. Thus, any binder that is left downhole but has not been displaced within the perforation to a suitable degree to contact the previously delivered activator, will eventually react with the encapsulated, slow-release activator to form a final end plug within the perforation. Examples of suitable clays for this purpose may include bentonite, smectite, or zeolite. The activator may be any phosphate acid, including phosphoric acid or monocalcium phosphate.

EXAMPLE

Perforations in a test well (3600 m; 177.8 mm production string; 244 mm surface casing; 73 mm work string) were sealed using cement compositions as follows:

Activator: Phosphoric acid, 52% saturated

Binder: Microfine calcium silicate, powdered, (CaO 46.25%, SiO2 52%, MgO 0.5%; Specific gravity 2.9; Fineness 2900 $m^2$/kg; bulk density 620 kg/$m^3$)

Cement formed: Strength 100-1000 psi; acid insoluble, invert compatible, transition time less than 1 minute Activator injection cleaned out the perforation tunnels and reduced injection pressure from 9 MPa to 3 Mpa. 350 litres of binder were injected in stages and partially sealed off the zone. A second squeeze was immediately circulated to bottom and a static wellbore pressure of 7 MPa was obtained. The next day, a full drift packer was run through the cemented perforations without drilling and the casing was pressure tested to 14 MPa.

Pressure test failures occurred approximately 30% of the time, compared with a 50-60% failure rate with hydraulic cement sealing and drillout of the casing.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for sealing a permeable zone along a wellbore, the method comprising:

delivering, in any order, a phosphate acid activator and an aqueous silicate binder suspension independently to a permeable wellbore zone; and allowing the activator and binder to react within the permeable wellbore zone to form a phosphosilicate ceramic composition.

2. The method as in claim 1, wherein the phosphate acid activator comprises liquid phosphoric acid, or a dissolved phosphate acid.

3. The method as in claim 1, wherein the silicate binder comprises calcium silicate.

4. The method as in claim 1, wherein the silicate binder comprises a mesh size between 200 and 5000 mesh.

5. The method as in claim 1, wherein the binder suspension further comprises a slow-release activator composition.

6. The method as in claim 5, wherein the slow-release activator composition comprises a mixture of a phosphate acid activator and a clay.

7. The method as in claim 1, wherein the permeable wellbore zone comprises a zone of undesirable permeability or porosity.

8. The method as in claim 1, wherein the permeable wellbore zone comprises a perforation within an isolated wellbore segment.

9. The method as in claim 1, and further comprising isolating a wellbore segment about the permeable zone prior to delivering the activator and the binder to the permeable wellbore zone.

10. The method as in claim 9, wherein delivering the binder to the permeable wellbore zone comprises:

delivering the binder to the isolated segment; and displacing the binder from the isolated segment into the permeable wellbore zone.

11. The method as in claim 9, wherein delivering the activator to the permeable wellbore zone comprises:

delivering the activator to the isolated segment; and displacing the activator from the isolated segment into the permeable wellbore zone.

12. The method as in claim 9, wherein the permeable wellbore zone is a casing perforation.

13. The method as in claim 12, wherein the activator is delivered to the isolated zone, followed by a volume of flushing fluid, followed by the aqueous silicate binder.

14. The method as in claim 1, wherein the wellbore is uncased.

15. The method as in claim 1, wherein the wellbore is cased and perforated.

16. The method as in claim 1, further comprising the step of flushing the permeable wellbore zone between the steps of delivering of the phosphate acid activator and delivering the aqueous silicate binder.

* * * * *